(12) United States Patent
Lin

(10) Patent No.: US 11,528,946 B2
(45) Date of Patent: Dec. 20, 2022

(54) CLOTH MASK

(71) Applicants: DAI LI ER COMPANY, Taichung (TW); Hsiang-Chun Lin, Taichung (TW)

(72) Inventor: Hsiang-Chun Lin, Taichung (TW)

(73) Assignees: DAI LI ER COMPANY, Taichung (TW); Hsiang-Chun Lin, Taichung (TW)

( * ) Notice: Subject to any disclaimer, the term of this patent is extended or adjusted under 35 U.S.C. 154(b) by 0 days.

(21) Appl. No.: 17/092,717

(22) Filed: Nov. 9, 2020

(65) Prior Publication Data
US 2022/0142273 A1    May 12, 2022

(51) Int. Cl.
*B32B 5/00*    (2006.01)
*A41D 13/11*    (2006.01)
(Continued)

(52) U.S. Cl.
CPC .......... *A41D 13/1192* (2013.01); *B32B 5/024* (2013.01); *B32B 7/02* (2013.01);
(Continued)

(58) Field of Classification Search
CPC ...... B01D 39/00; B01D 39/08; B01D 39/083; B01D 39/086; B01D 39/14; B01D 39/16; B01D 39/20; B01D 39/1607; B01D 39/1692; B01D 39/2027; B01D 39/2041; B01D 39/2068; B01D 39/2082; B01D 46/00; B01D 46/0001; B01D 46/0019; B01D 46/0023; B01D 46/0027; B01D 46/0028; B01D 46/0036; B01D 2221/16; B01D 2239/00; B01D 2239/02; B01D 2239/0208; B01D 2239/025; B01D 2239/04; B01D 2239/0407; B01D 2239/0442; B01D 2239/06; B01D 2239/065; B01D 2239/0654; B01D 2239/10; B01D 2257/00; B01D 2257/80; B01D 2257/91; B01D 2258/00; B01D 2258/02; B01D 2258/06; B01D 2259/45; B01D 2259/4508; B01D 2259/4533; B01D 2259/4541; B01D 2259/4583; B01D 2267/00; B01D 2267/40; B01D 2275/00; B01D 2275/10; A62B 23/00; A62B 23/025; A62B 7/00; A62B 18/00; A62B 17/006; A62B 18/02; A62B 18/025; C08K 2201/00; C08K 3/08; A01N 59/20; A01N 25/10; A01N 25/34; A01N 59/16; A01N 2300/00;
(Continued)

(56) References Cited

U.S. PATENT DOCUMENTS

2009/0232962 A1*  9/2009  Marcoon ............ B01D 46/0028
                                                              427/2.1

* cited by examiner

*Primary Examiner* — Allison G Fitzsimmons
(74) *Attorney, Agent, or Firm* — Muncy, Geissler, Olds & Lowe, P.C.

(57) ABSTRACT

A cloth mask includes a body, where the body has a piece of copper ion cloth and a piece of zinc oxide antibacterial cloth, the copper ion cloth is woven by a mixture of a first yarn, a second yarn and a copper yarn, the first yarn has a hydrophobicity and a moisture permeability and can form a water-resistant surface, and has a water-repellent effect and is exposed at an inner layer of the copper ion cloth, and the second yarn has a moisture-removing property and can form an antibacterial and moisture-removing surface to be exposed together with the copper yarn on a surface of the copper ion cloth.

6 Claims, 10 Drawing Sheets

(51) Int. Cl.
 B32B 5/02 (2006.01)
 B32B 15/20 (2006.01)
 B32B 7/02 (2019.01)
 B32B 15/14 (2006.01)
 B01D 37/00 (2006.01)
(52) U.S. Cl.
 CPC .............. *B32B 15/14* (2013.01); *B32B 15/20* (2013.01); *B32B 2250/03* (2013.01); *B32B 2250/20* (2013.01); *B32B 2264/1025* (2020.08); *B32B 2307/7145* (2013.01); *B32B 2307/7265* (2013.01); *B32B 2307/73* (2013.01); *B32B 2535/00* (2013.01)
(58) Field of Classification Search
 CPC ......... A01N 57/00; A61L 15/26; A61L 15/52; A61L 2202/22; A61L 2/0017; A61L 2/0082; A61L 2/022; A61L 2/16; A61L 2/26; A61L 9/014
 See application file for complete search history.

CLOTH MASK

BACKGROUND

Technical Field

The present invention relates to a reusable cloth mask, and in particular, to an antibacterial cloth mask that includes at least one layer of copper ion cloth and one layer of zinc oxide antibacterial cloth, has water resistance through an inner layer of the copper ion cloth and a function of moisture removal through a surface layer, and may keep dry and comfortable.

Related Art

As the air pollution problem is increasingly serious, wearing a mask out, especially for people riding motorcycles, is indispensable. The main reason is that wearing a mask can isolate dust, bacteria, oil fume, and bad odors, droplets and the like in the air, to maintain good respiratory quality and maintain health of the respiratory tracts and the lungs. Especially for civil construction workers, on-site workers working in factory manufacturing, medical staff and the like, to prevent inhalation of dust, polluted harmful substances, pathogens and allergens in the air, wearing a mask has become a necessary action. In addition, COVID-19 is rampantly spreading all over the world currently, and is transmitted through droplets in the air.

However, a mask being worn, especially a cloth mask covers the mouth, the nose and the chin, and left and right sides of the mask stick to the cheeks. Although the mask can filter out pollutants in the air to prevent the pollutants from entering the body, if the mask has been worn for a long time, problems of sultriness and sweating due to hot carbon dioxide gas exhaled by the human body and hot weather and high temperature will be presented. In addition, wearing the mask to talk to people will cause saliva in the mouth and sweat to adhere with the breath on an inner side of the mask. With the increase in the frequency and time of use, the mask will produce moist and sweat odor and breed bacterial pathogens.

In view of this, the inventor of the present invention makes continuous efforts to research and improve experiments based on years of experience in related products, and finally develops a cloth mask with antibacterial and moisture removal effects.

SUMMARY

A main objective of the present invention is to provide a mask made by sewing a piece of copper ion cloth, a piece of zinc oxide antibacterial cloth and a cool cloth layer in contact with skin. An inner layer of the copper ion cloth may resist water, and a surface layer may remove moisture, so that a water-resistant surface in contact with skin may not damp after receiving a slight pressure to absorb sweat. Sweat is absorbed by a moisture-removing surface on a surface layer through the water-resistant surface and the moisture is removed, to enable the mask to keep dry. In addition, the zinc oxide antibacterial cloth may block ultraviolet light and inhibit growth of bacteria, achieving good antibacterial and bacteriostatic functions.

To achieve the foregoing objective, the present invention discloses a cloth mask, comprising a body, where the body has a piece of copper ion cloth located at an outer layer, a piece of zinc oxide antibacterial cloth located at an intermediate layer, and a cool cloth layer located at an inner layer in contact with skin; the copper ion cloth is woven by a mixture of a first yarn, a second yarn and a copper yarn, the first yarn has a hydrophobicity and a moisture permeability and can form a water-resistant surface to be exposed at an inner layer of the copper ion cloth, and the second yarn has a moisture-removing property and can form an antibacterial and moisture-removing surface to be exposed together with the copper yarn on a surface of the copper ion cloth; the zinc oxide antibacterial cloth is immersed in a zinc oxide solution to contain a zinc oxide ingredient; and the cool cloth layer is selected from nylon fiber, nylon yarn and elastic fiber added with mineral powder and jade powder materials and mixed with a textile material with good water absorption during a spinning process.

The first yarn accounts for a coverage rate of 85% to 95% of the inner layer of the copper ion cloth; the second yarn accounts for a coverage rate of 65% to 70% of a surface layer of the copper ion cloth; and the copper yarn accounts for a coverage rate of 20% to 25% of the surface layer of the copper ion cloth, a material of the first yarn is one of polyamide fiber, polyester fiber and a polypropylene polymer, a material of the second yarn is one of artificial fiber and natural fiber with good breathability and moisture-removing property, and a copper ion content in the copper yarn is 5% to 6%, where before performing fiber drawing, a raw material is immersed in a copper ion solution, to make the raw material contain copper ions, and then the drawing is performed.

The copper ion cloth can be immersed in the zinc oxide solution with a concentration of 5% to 6%, to make the first yarn and the second yarn contain the zinc oxide ingredient.

The zinc oxide antibacterial cloth is made of a material selected from a blend of Tetoron and cotton and is immersed in the zinc oxide solution with a concentration of 5% to 6%, to make the zinc oxide antibacterial cloth contain the zinc oxide ingredient.

The nylon fiber, the nylon yarn and the elastic fiber contained in the cool cloth layer are added with mineral powder and jade powder materials and mixed with a textile material with good water absorption during the spinning process.

A breathable mesh layer is further included, the breathable mesh layer is disposed between the copper ion cloth and the zinc oxide antibacterial cloth, and the breathable mesh layer is woven from yarns of the nylon and the elastic fiber, and has good breathability.

A piece of decorative cloth located at an outermost layer is further included, the decorative cloth is attached to the copper ion cloth, and the decorative cloth is cloth containing spun silver fiber.

The present invention further discloses a cloth mask, including a body, where the body has a piece of copper ion cloth located at an outer layer, an antibacterial filter cotton located at an intermediate layer, and one of a piece of bamboo carbon fiber cloth and a cool cloth layer that can deodorize in contact with skin; the copper ion cloth is woven by a mixture of a first yarn, a second yarn and a copper yarn, the first yarn has a hydrophobicity and a moisture permeability and can form a water-resistant surface to be exposed at an inner layer of the copper ion cloth, and the second yarn has a moisture-removing property and can form an antibacterial and moisture-removing surface to be exposed together with the copper yarn on a surface of the copper ion cloth; the antibacterial filter cotton is immersed in a zinc oxide solution to make the antibacterial filter cotton contain a zinc oxide ingredient; the antibacterial filter cotton further comprises a first cloth layer, a second cloth layer and a third cloth layer, the first cloth layer is made of polyester fiber and cotton, the second cloth layer is made of nylon, the third cloth layer is made of polyester fiber, the third cloth layer is attached to the bamboo carbon fiber cloth, the first cloth layer is attached to the copper ion cloth, and two pieces of left-right symmetrical copper ion cloth are disposed between the copper ion cloth and the first cloth layer.

The present invention further provides a cloth mask, including a body, where the body has a piece of copper ion cloth located at an outer layer, an antibacterial filter cotton located at an intermediate layer, and one of a piece of bamboo carbon fiber cloth and a cool cloth layer that can deodorize in contact with skin; the copper ion cloth is woven by a mixture of a first yarn, a second yarn and a copper yarn, the first yarn has a hydrophobicity and a moisture permeability and can form a water-resistant surface to be exposed at an inner layer of the copper ion cloth, and the second yarn has a moisture-removing property and can form an antibacterial and moisture-removing surface to be exposed together with the copper yarn on a surface of the copper ion cloth; the antibacterial filter cotton is immersed in a zinc oxide solution to make the antibacterial filter cotton contain a zinc oxide ingredient; the antibacterial filter cotton further comprises a first cloth layer, a second cloth layer and a third cloth layer, the first cloth layer is made of polyester fiber and cotton, the second cloth layer is made of nylon, the third cloth layer is made of polyester fiber, the third cloth layer is attached to the bamboo carbon fiber cloth, the first cloth layer is attached to the copper ion cloth, and two pieces of left-right symmetrical copper ion cloth are disposed between the copper ion cloth and the first cloth layer.

The two pieces of left-right symmetrical copper ion cloth are disposed between the copper ion cloth and the first cloth layer.

Therefore, the present invention has at least the following advantages.

In the present invention, a first yarn of the copper ion cloth has a hydrophobicity and a moisture permeability to form a water-resistant surface to be exposed at an inner layer of a piece of copper ion cloth, and a second yarn has a moisture-removing property to form an antibacterial and moisture-removing surface to be exposed together with a copper yarn on a surface of the copper ion cloth. When a liquid such as sweat just drips onto the water-resistant surface, the liquid will not immediately penetrate into the copper ion cloth, but will form a drop of water on the water-resistant surface. The drop of water may slowly penetrate into the copper ion cloth only when a contact pressure is applied through an external force or the drop of water has stayed for a long time, and moisture is removed through the antibacterial and moisture-removing surface, keeping a cloth mask dry and having an antibacterial effect.

In the present invention, the cloth mask includes a piece of zinc oxide antibacterial cloth. Fiber has high elasticity because the zinc oxide ingredient is contained, so that ultraviolet rays can be blocked and droplets and large-particle dust can be prevented, thereby achieving antibacterial and deodorant effects.

In the present invention, a cool cloth layer is in contact with skin. If worn in summer, the cloth mask may have good effects of moisture absorption, perspiration elimination, breathability and non-stickiness, and the cloth mask has a breathable mesh layer, so that when worn, the cloth mask may be breathable and make breathing smooth, and the bamboo carbon fiber cloth may be in contact with the skin, thereby having a deodorizing effect.

DETAILED DESCRIPTION

Figure 1:
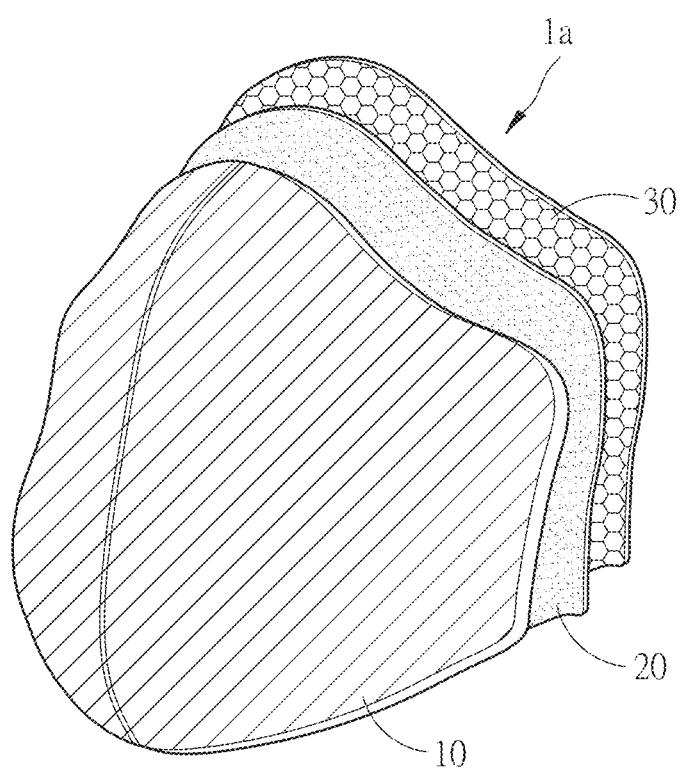
FIG. 1 is a schematic three-dimensional diagram of a first embodiment according to the present invention.
Figure 2:
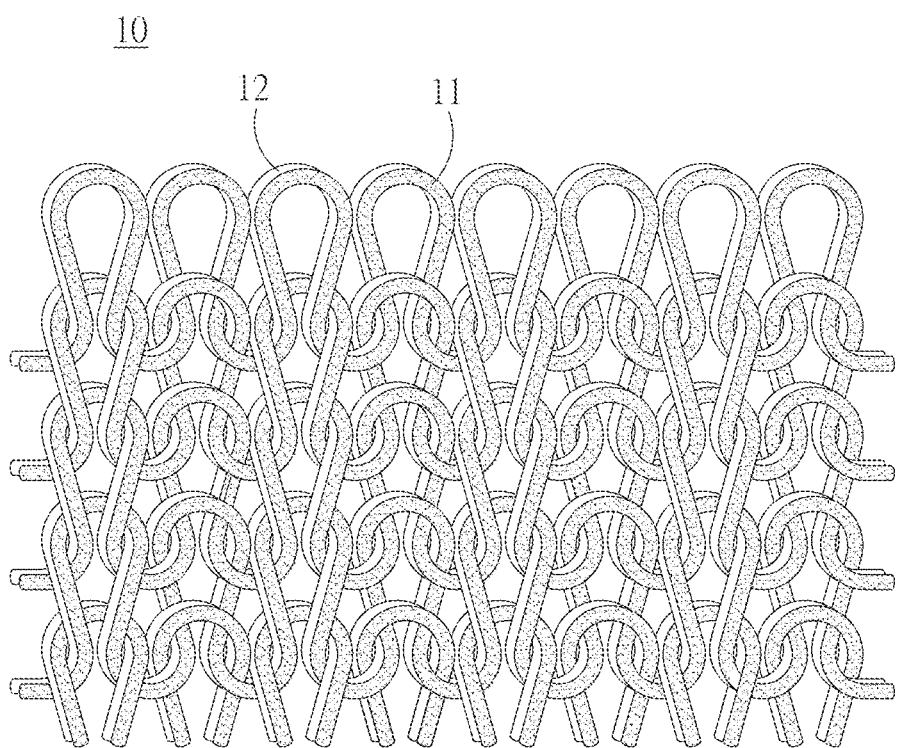
FIG. 2 is a schematic diagram of a first yarn of copper ion cloth of the first embodiment according to the present invention.
Figure 3:
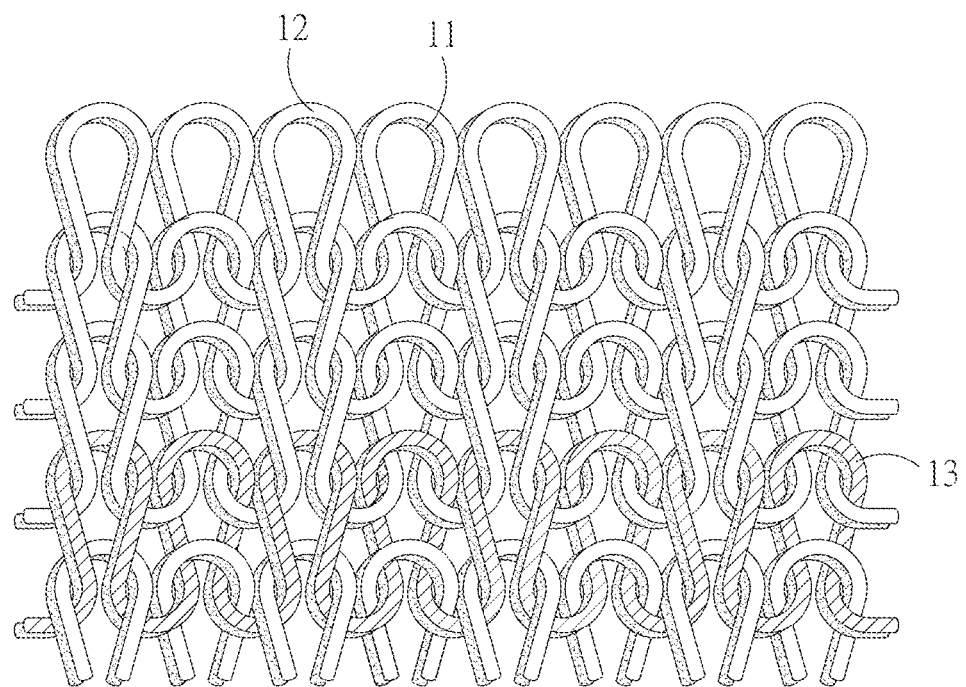
FIG. 3 is a schematic diagram of a second yarn and a copper yarn of copper ion cloth of the first embodiment according to the present invention.

With regard to the detailed content and technical descriptions of the present invention, embodiments are now used for further description, but it should be understood that the embodiments are only used for illustrative purposes, and should not be interpreted as limitations on implementation of the present invention.

Referring to FIG. 1 to FIG. 6, a first embodiment of a cloth mask according to the present invention is shown. The cloth mask includes a body 1a, the body 1a has a piece of copper ion cloth 10 with antibacterial and water-repellent effects located at an outer layer, a piece of zinc oxide antibacterial cloth 20 located at an intermediate layer, and a cool cloth layer 30 located at an inner layer in contact with skin. The copper ion cloth 10 is woven by a mixture of a first yarn 11, a second yarn 12 and a copper yarn 13, the first yarn 11 has a hydrophobicity and a moisture permeability and can form a water-resistant surface 14 to be exposed at an inner layer of the copper ion cloth 10, and the second yarn 12 has a moisture-removing property and can form an antibacterial and moisture-removing surface 15 to be exposed together with the copper yarn 13 at a surface layer of the copper ion cloth 10.

The first yarn 11 accounts for a coverage rate of 85% to 95% of the inner layer of the copper ion cloth 10; the second yarn 12 accounts for a coverage rate of 65% to 70% of the surface layer of the copper ion cloth 10; and the copper yarn 13 accounts for a coverage rate of 20% to 25% of the surface layer of the copper ion cloth 10. A main material of the first yarn 11 is one of polyamide fiber, polyester fiber and a polypropylene polymer, the inner layer of the copper ion cloth 10 with a larger coverage rate of the first yarn 11 can form the water-resistant surface 14, thereby achieving a water-repellent effect. When a liquid such as sweat just drips onto the water-resistant surface 14, the liquid will not immediately penetrate into the copper ion cloth 10, but will form a drop of water 100 on the water-resistant surface 14. The drop of water 100 may slowly penetrate into the copper ion cloth 10 only when a contact pressure is applied through an external force or the drop of water 100 has stayed for a long time, and moisture is removed through the antibacterial and moisture-removing surface 15.

A material of the second yarn 12 is one of artificial fiber and natural fiber, for example, rayon, Tencel, cotton, linen, natural silk and other fiber materials with good breathability and moisture-removing property. A copper ion content in the copper yarn 13 is 5% to 6%, where before performing fiber drawing, a raw material is immersed in a copper ion solution, to make the raw material contain copper ions, and then the drawing is performed. As a result, the drawn yarn may naturally contain the copper ions. The copper ion has analgesic, antipyretic, antibacterial and anti-inflammatory properties, and a trace amount of copper ions can attack cell membranes, nucleic acids, enzymes of bacteria, and destroy cell proteins, causing the bacteria to die and lose the ability to divide and proliferate, so that the copper ion has a good antibacterial property and can inhibit proliferation of the bacteria and fungi to prevent bad smells and eliminate unpleasant odors.

Figure 4:
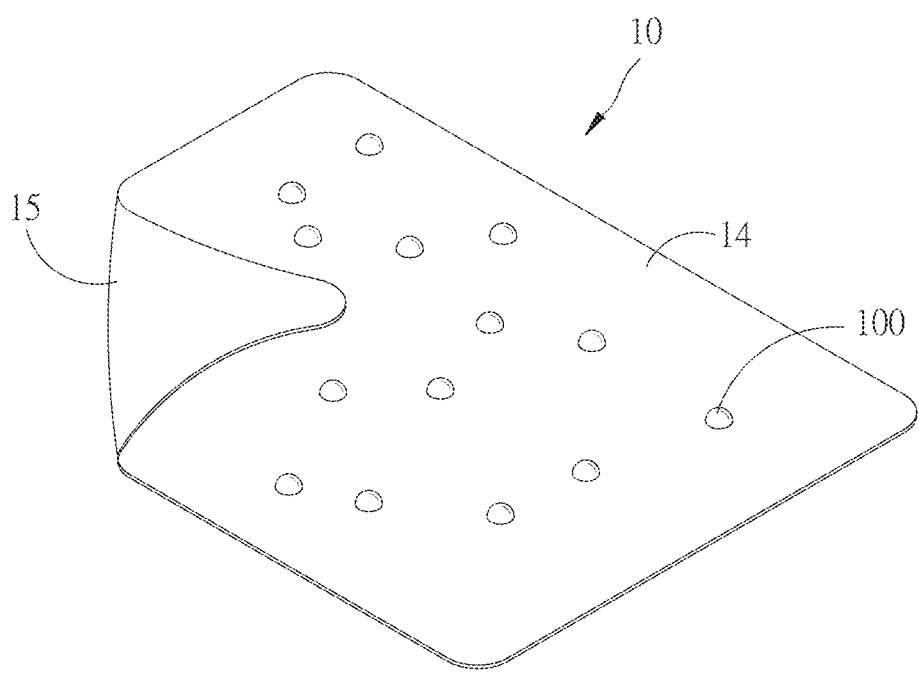
FIG. 4 is a schematic diagram of a water-resistant surface of the first embodiment according to the present invention.
Figure 5:
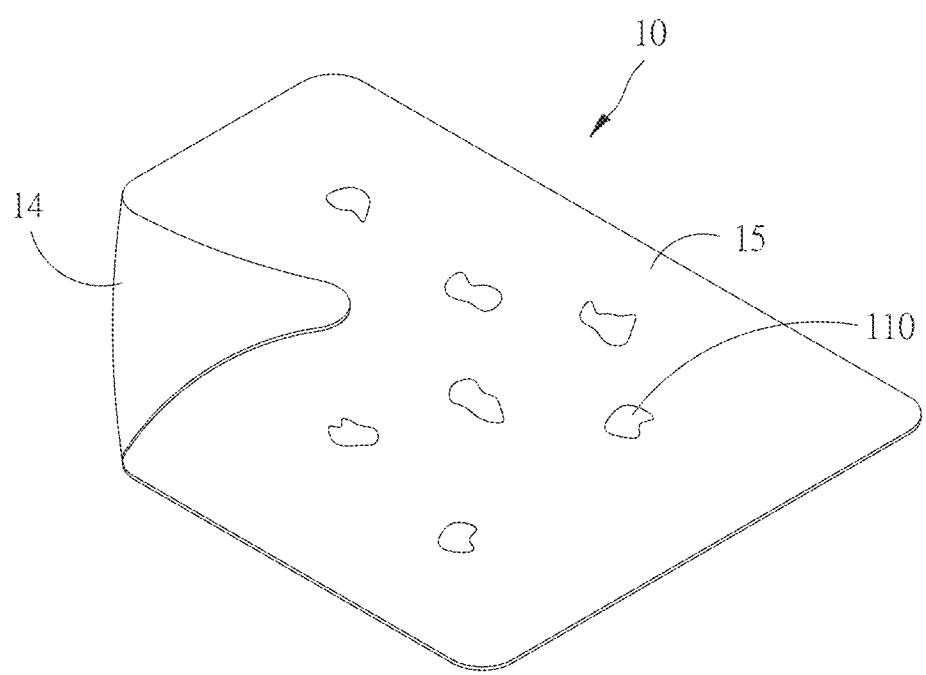
FIG. 5 is a schematic diagram of an antibacterial and moisture-removing surface of the first embodiment according to the present invention.
Figure 6:
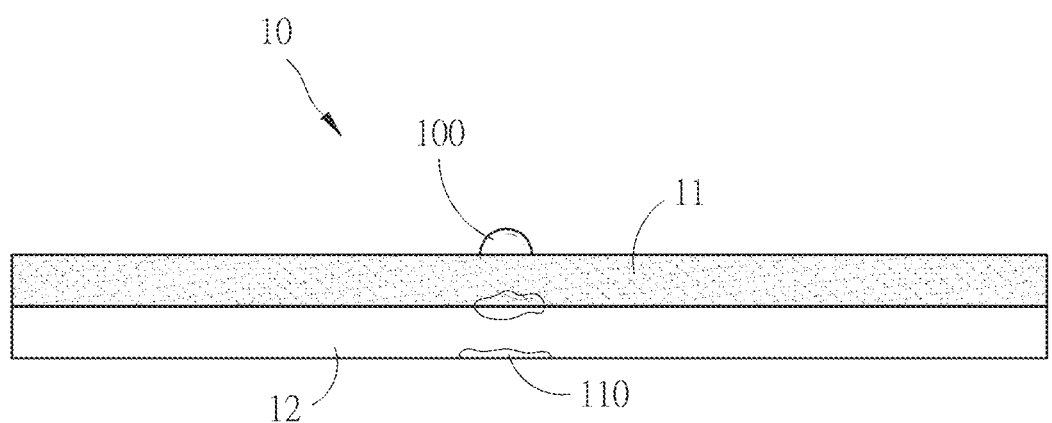
FIG. 6 is a schematic two-dimensional diagram of the first embodiment stained with a liquid according to the present invention.

In addition, the surface layer of the copper ion cloth 10 with a larger coverage rate of the second yarn 12 and the copper yarn 13 can form an antibacterial and moisture-removing surface 15. When the liquid such as the sweat penetrates into the antibacterial and moisture-removing surface 15 from the water-resistant surface 14, the antibacterial and moisture-removing surface 15 may present a water stain 110, as shown in FIG. 4 to FIG. 6, and due to an improvement of the breathability and the moisture-removing property, the water stain 110 may be eliminated quickly to keep dry.

During implementation, the copper ion cloth 10 can be immersed in a zinc oxide solution with a concentration of 5% to 6%, to make the first yarn 11 and the second yarn 12 contain a zinc oxide ingredient. Because the zinc oxide has good stability, elasticity of the fiber is high, and the zinc oxide has a very strong function of absorbing ultraviolet rays and can block ultraviolet light. The zinc oxide also has a very good antibacterial mechanism and has good antibacterial and deodorant effects.

The zinc oxide antibacterial cloth 20 is made of a material selected from TC cloth (a blend of Tetoron and cotton) and is immersed in the zinc oxide solution with a concentration of 5% to 6%, to make the zinc oxide antibacterial cloth 20 contain the zinc oxide ingredient. The zinc oxide itself is non-toxic and is non-irritating to the skin, and has good thermal stability to make the fiber have high elasticity, so that the zinc oxide has a very strong function of absorbing ultraviolet rays and can block ultraviolet light, and is not easy to breed pathogenic bacteria and prevents droplets and large-particle dust from passing through, achieving the antibacterial and deodorant effects.

The cool cloth layer 30 may be selected from the nylon fiber, the nylon yarn and the elastic fiber added with mineral powder and jade powder materials and mixed with a textile material with good water absorption during a spinning process, so that the cool cloth layer 30 has good effects of moisture absorption, perspiration elimination and breathability, and may achieve comfortable and non-sticky effects.

Figure 7:
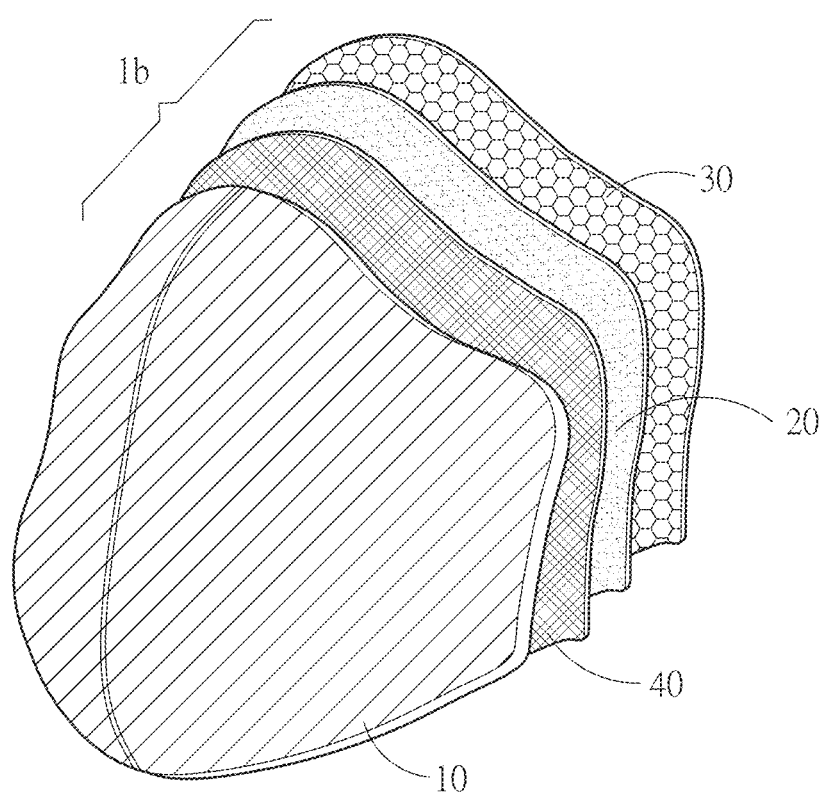
FIG. 7 is a schematic three-dimensional diagram of a second embodiment according to the present invention.

Referring to FIG. 7, FIG. 7 is a second embodiment of a cloth mask according to the present invention, generally including a body 1b. The body 1b has a piece of copper ion cloth 10 with antibacterial and water-repellent effects located at an outer layer, a piece of zinc oxide antibacterial cloth 20, a cool cloth layer 30 located at an inner layer in contact with skin, and a breathable mesh layer 40. The breathable mesh layer 40 is disposed between the copper ion cloth 10 and the zinc oxide antibacterial cloth 20, and the breathable mesh layer 40 is woven by yarns containing 78% nylon and 22% elastic fiber, and has good breathability.

Figure 8:
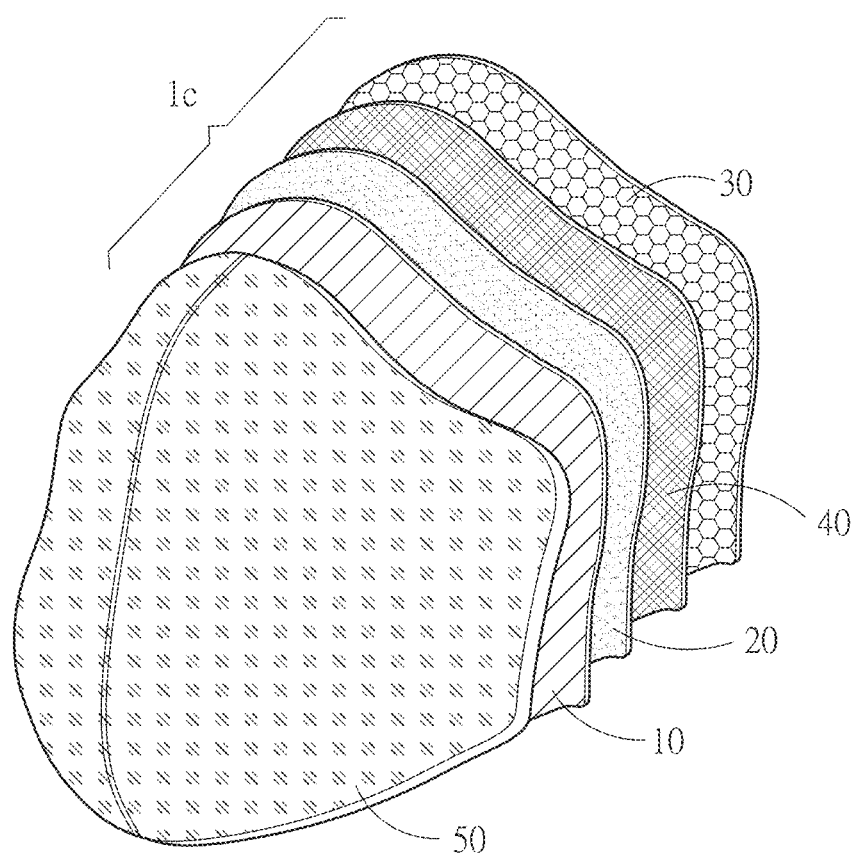
FIG. 8 is a schematic three-dimensional diagram of a third embodiment according to the present invention.

Referring to FIG. 8, FIG. 8 is a third embodiment of a cloth mask according to the present invention, including a body 1c. The body 1c has a piece of decorative cloth 50 located at an outermost layer, a cool cloth layer 30 located at an innermost layer in contact with skin, a breathable mesh layer 40 attached to an outer surface of the cool cloth layer 30, a piece of copper ion cloth 10 attached to an inner surface of the decorative cloth 50, and a piece of zinc oxide antibacterial cloth 20 between the copper ion cloth 10 and the breathable mesh layer 40, and the breathable mesh layer 40 is between the cool cloth layer 30 and the zinc oxide antibacterial cloth 20. The material of the copper ion cloth 10 has antibacterial and waterproof functions, the zinc oxide antibacterial cloth 20 contains zinc oxide, is non-absorbent and resistant to germs and may isolate droplets and large-particle dust, and the decorative cloth 50 is cloth containing spun silver fiber. The cool cloth layer 30 is woven by a blend of 42.5% nylon, 42.5% nylon cool yarn and 15% elastic fiber, so that the cool cloth layer 30 can produce one to two degrees of coolness instantly when in contact with the skin. After 30 minutes of sunshine, a temperature difference of three to five degrees will be generated to produce a cool feeling on the skin. The breathable mesh layer 40 may prevent stuffiness to improve comfort of breathing.

Figure 9:
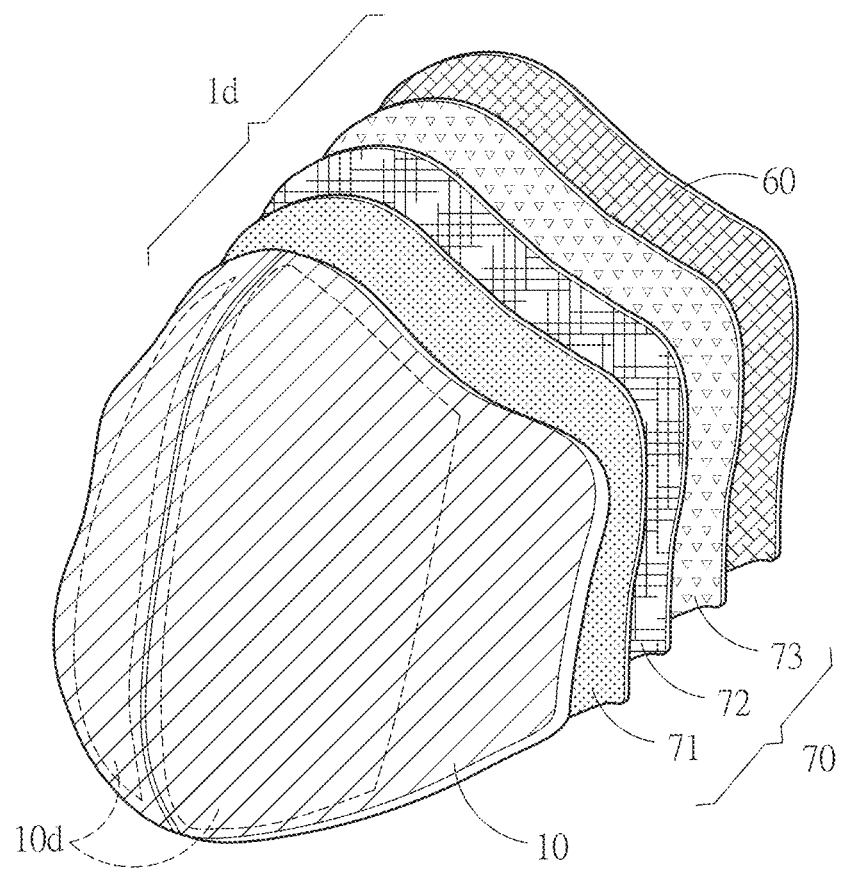
FIG. 9 is a schematic three-dimensional diagram of a fourth embodiment according to the present invention.

Referring to FIG. 9, FIG. 9 is a fourth embodiment of a cloth mask according to the present invention, including a body 1d. The body 1d has a piece of copper ion cloth 10 at an outer layer, a piece of bamboo carbon fiber cloth 60 at an inner layer in contact with skin, and an antibacterial filter cotton 70 located at an intermediate layer. The antibacterial filter cotton 70 is immersed in a zinc oxide solution, to make the antibacterial filter cotton 70 contain a zinc oxide ingredient. The antibacterial filter cotton 70 further includes a first cloth layer 71, a second cloth layer 72 and a third cloth layer 73, the first cloth layer 71 is made of 65% polyester fiber and 35% cotton, the second cloth layer 72 is made of 100% nylon, and the third cloth layer 73 is made of 100% polyester fiber. The third cloth layer 73 is attached to an outer surface of the bamboo carbon fiber cloth 60, the first cloth layer 71 is attached to an inner surface of the copper ion cloth 10, and two pieces of left-right symmetrical copper ion cloth 10d are disposed between the copper ion cloth 10 and the first cloth layer 71, where the bamboo carbon fiber cloth 60 has a deodorizing effect.

Figure 10:
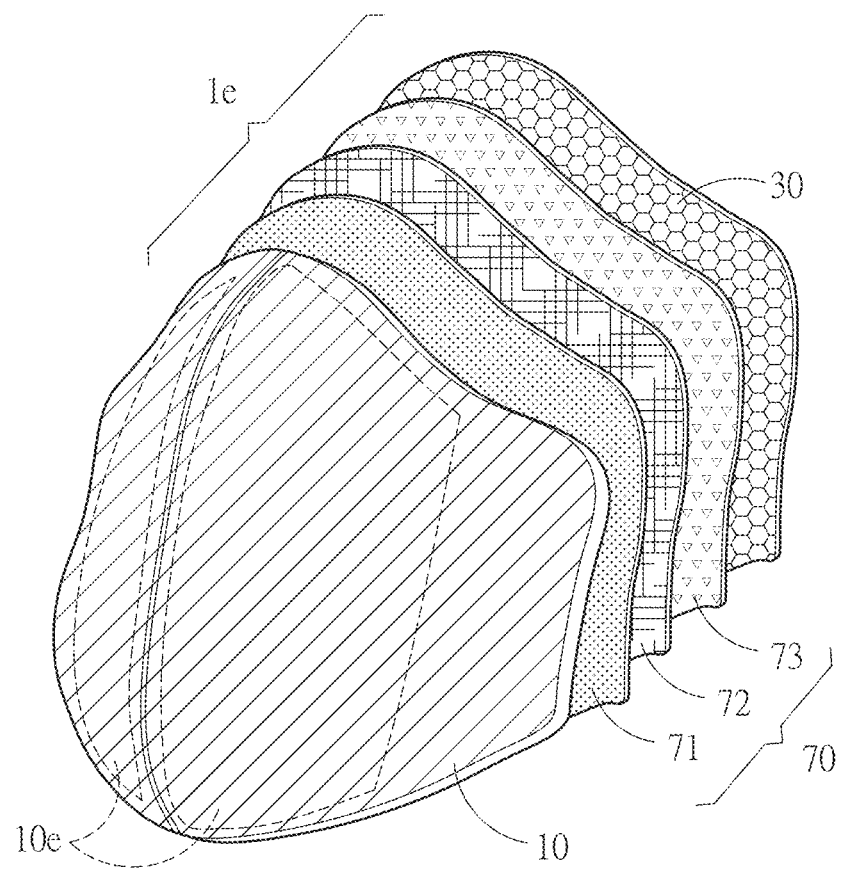
FIG. 10 is a schematic three-dimensional diagram of a fifth embodiment according to the present invention.

Referring to FIG. 10, FIG. 10 is a fifth embodiment of a cloth mask according to the present invention, including a body 1e. The body 1e has a piece of copper ion cloth 10 at an outer layer, a cool cloth layer 30 at an inner layer in contact with skin, and an antibacterial filter cotton 70 located at an intermediate layer. The antibacterial filter cotton 70 is immersed in a zinc oxide solution, to make the antibacterial filter cotton 70 contain a zinc oxide ingredient. The antibacterial filter cotton 70 further includes a first cloth layer 71, a second cloth layer 72 and a third cloth layer 73, the first cloth layer 71 contains 65% polyester fiber and 35% cotton, the second cloth layer 72 contains 100% nylon, and the third cloth layer 73 contains 100% polyester fiber. The third cloth layer 73 is attached to an outer surface of the cool cloth layer 30, the first cloth layer 71 is attached to an inner surface of the copper ion cloth 10, and two pieces of left-right symmetrical copper ion cloth 10e are disposed between the copper ion cloth 10 and the first cloth layer 71.

Therefore, cloth masks with different quantities of layers may be selected according to air quality and seasonal temperature of different environments. When in summer or in a high-temperature zone, the cloth masks in the first embodiment and the second embodiment shown in FIG. 1 and FIG. 7 may be selected. In the two embodiments, the cool cloth layer 30 is in contact with the cheeks, and will have a cool and comfortable touch when in contact with the skin in summer or in a relatively high temperature environment. The intermediate zinc oxide antibacterial cloth 20 may isolate droplets and large-particle dust, and the copper ion cloth 10 at the outer layer has a good antibacterial property and may inhibit proliferation of bacteria and fungi and eliminate unpleasant odors. Especially the inner layer of the copper ion cloth 10 with a larger coverage rate of the first yarn 11 forms a water-resistant surface 14, and may achieve a water-repellent effect. When sweat drips onto the water-resistant surface 14, the sweat will not immediately penetrate into the copper ion cloth 10, but will form a drop of water on the water-resistant surface 14. The drop of water may slowly penetrate into the copper ion cloth 10 only when a contact pressure is applied through an external force or the drop of water has stayed for a long time, and the antibacterial and moisture-removing surface 15 is enabled to present a water stain, so that the moisture is quickly removed and the cloth mask keeps dry.

However, if the cloth mask shown in FIG. 8 in the third embodiment is used, the outermost layer of the cloth mask has the decorative cloth 50 with spun silver fiber, so that a specific beauty of the mask is improved.

If in a cold zone, a cold season or a place with poor air quality, the cloth mask shown in FIG. 9 in the fourth embodiment may be selected. In the fourth embodiment, the cloth mask further includes the bamboo carbon fiber cloth 60 in contact with the cheeks, so that the cloth mask has a deodorizing effect, and the inner surface of the copper ion cloth 10 at the outermost layer is attached to the two pieces of left-right symmetrical copper ion cloth 10d and may enhance the antibacterial, water-repellent and quick-drying performance. In addition, the intermediate layer of the mask is the zinc oxide antibacterial cloth 20, and may prevent the droplets and the large-particle dust and filter out harmful bacteria and dust in the air. Moreover, the cloth mask is sewn with six layers of cloth made of different materials, and therefore has a considerable warmth retention effect.

Certainly, a user may alternatively select the cloth mask shown in FIG. 10 in the fifth embodiment. The cloth mask has the cool cloth layer 30 attached to the cheeks, so that the cloth mask has a good water absorption and may absorb the sweat, and has a breathability, thereby being comfortable and not sticking to the skin, and the inner surface of the copper ion cloth 10 at the outermost layer is attached to the two pieces of left-right symmetrical copper ion cloth 10e and may enhance the antibacterial, water-repellent and quick-drying performance. In addition, the intermediate layer is the zinc oxide antibacterial cloth 20, and may prevent the droplets and the large-particle dust and filter out harmful bacteria and dust in the air. Moreover, the cloth mask is sewn with six layers of cloth made of different materials, and therefore has a considerable warmth retention effect.

The present invention has at least the following advantages.

In the present invention, a first yarn of the copper ion cloth has a hydrophobicity and a moisture permeability to form a water-resistant surface to be exposed at an inner layer of a piece of copper ion cloth, and a second yarn has a moisture-removing property to form an antibacterial and moisture-removing surface to be exposed together with a copper yarn on a surface of the copper ion cloth. When a liquid such as sweat just drips onto the water-resistant surface, the liquid will not immediately penetrate into the copper ion cloth, but will form a drop of water on the water-resistant surface. The drop of water may slowly penetrate into the copper ion cloth only when a contact pressure is applied through an external force or the drop of water has stayed for a long time, and moisture is removed through the antibacterial and moisture-removing surface, keeping a cloth mask dry and having an antibacterial effect.

In the present invention, the cloth mask includes a piece of zinc oxide antibacterial cloth. Fiber has high elasticity because the zinc oxide ingredient is contained, so that ultraviolet rays can be blocked and droplets and large-particle dust can be prevented, thereby achieving antibacterial and deodorant effects.

In the present invention, a cool cloth layer is in contact with skin. If worn in summer, the cloth mask may have good effects of moisture absorption, perspiration elimination, breathability and non-stickiness, and the cloth mask has a breathable mesh layer, so that when worn, the cloth mask may be breathable and make breathing smooth, and the bamboo carbon fiber cloth may be in contact with the skin, thereby having a deodorizing effect.

The present invention has been described with exemplary embodiments above. However, one skilled in the art should understand that the embodiments are only used to describe the present invention, and are not intended to limit the scope of the present invention. It should be noted that, any changes and replacements equivalent to the embodiments shall fall within the scope of the present invention. Therefore, the protection scope of the present invention shall be subject to the scope of the following claims.

What is claimed is:

1. A cloth mask, comprising:
a body, wherein the body has a piece of copper ion cloth located at an outer layer, a piece of zinc oxide antibacterial cloth located at an intermediate layer, and a cloth layer located at an inner layer in contact with skin; and
the copper ion cloth is woven by a mixture of a first yarn, a second yarn and a copper yarn, the first yarn has a hydrophobicity and a permeability and forms a water-resistant surface to be exposed at an inner layer of the copper ion cloth, and the second yarn forms an antibacterial and moisture-removing surface to be exposed together with the copper yarn on a surface of the copper ion cloth; the zinc oxide antibacterial cloth is immersed in a zinc oxide solution to contain a zinc oxide ingredient; and the cloth layer comprises one of nylon fiber, nylon yarn and elastic fiber added with mineral powder and jade powder materials and mixed with a textile material with water absorption during a spinning process.

2. The cloth mask according to claim 1, wherein the first yarn accounts for a coverage rate of 85% to 95% of the inner layer of the copper ion cloth; the second yarn accounts for a coverage rate of 65% to 70% of a surface layer of the copper ion cloth; and the copper yarn accounts for a coverage rate of 20% to 25% of the surface layer of the copper ion cloth, a material of the first yarn is one of polyamide fiber, polyester fiber and a polypropylene polymer, a material of the second yarn is one of artificial fiber and natural fiber with breathability, and a copper ion content in the copper yarn is 5% to 6%, wherein before performing fiber drawing, a raw material is immersed in a copper ion solution, to make the raw material contain copper ions, and then the drawing is performed.

3. The cloth mask according to claim 1, wherein the copper ion cloth is immersed in the zinc oxide solution with a concentration of 5% to 6%, to make the first yarn and the second yarn contain the zinc oxide ingredient.

4. The cloth mask according to claim 1, wherein the zinc oxide antibacterial cloth is made of a material selected from a blend of polyester and cotton and is immersed in the zinc oxide solution with a concentration of 5% to 6%, to make the zinc oxide antibacterial cloth contain the zinc oxide ingredient.

5. The cloth mask according to claim 1, further comprising a breathable mesh layer, wherein the breathable mesh layer is disposed between the copper ion cloth and the zinc oxide antibacterial cloth, and the mesh layer is woven from yarns of the nylon and the elastic fiber, and has breathability.

6. The cloth mask according to claim 5, further comprising a piece of decorative cloth located at an outermost layer, wherein an inner surface of the decorative cloth is attached to the copper ion cloth, and the decorative cloth is cloth containing spun silver fiber.

\* \* \* \* \*